US009749416B2

United States Patent
Forrest et al.

(10) Patent No.: US 9,749,416 B2
(45) Date of Patent: *Aug. 29, 2017

(54) MANAGING INVENTORY DATA FOR A DISTRIBUTED CACHE PROVIDED BY A PLURALITY OF WIRELESS MOBILE DEVICES

(71) Applicant: INTERNATIONAL BUSINESS MACHINES CORPORATION, Armonk, NY (US)

(72) Inventors: Patrick Daniel Forrest, Cork (IE); Ivan Patrick Murray, Cork (IE); Ken Murray, Cork (IE); Patrick O'Neill, Cork (IE); Ted Whooley, Cork (IE)

(73) Assignee: International Business Machines Corporation, Armonk, NY (US)

( * ) Notice: Subject to any disclaimer, the term of this patent is extended or adjusted under 35 U.S.C. 154(b) by 332 days.

This patent is subject to a terminal disclaimer.

(21) Appl. No.: 14/472,294

(22) Filed: Aug. 28, 2014

(65) Prior Publication Data

US 2015/0149527 A1 May 28, 2015

Related U.S. Application Data

(63) Continuation of application No. 14/122,322, filed on Nov. 26, 2013, now Pat. No. 9,270,755.

(51) Int. Cl.
*H04L 29/08* (2006.01)
*H04W 4/02* (2009.01)

(52) U.S. Cl.
CPC ......... *H04L 67/1097* (2013.01); *H04L 67/04* (2013.01); *H04L 67/1095* (2013.01); *H04L 67/2842* (2013.01); *H04W 4/023* (2013.01)

(58) Field of Classification Search
CPC ................. H04L 67/1097; H04L 67/1074
(Continued)

(56) References Cited

U.S. PATENT DOCUMENTS 6,851,049 B1 2/2005 Price
6,941,310 B2* 9/2005 Ahad ................. G06F 17/3048
(Continued)

FOREIGN PATENT DOCUMENTS

CN 101848236 A 9/2010
GB 2415854 A 4/2006
(Continued)

OTHER PUBLICATIONS

"Peer-to-Peer Networks for Content Sharing"—Ding et al, Grid Computing and Distributed Systems Laboratory, Department of Computer Science and Software Engineering, The University of Melbourne, May 2004 http://www.cloudbus.org/papers/P2PbasedContentSharing.pdf.*

(Continued)

*Primary Examiner* — Randy Scott
(74) *Attorney, Agent, or Firm* — Yudell Isidore PLLC

(57) ABSTRACT

A method for distributing inventory data for a distributed cache provided by a plurality of wireless mobile communication devices. A first inventory data is received from a first wireless mobile communication device, and a second inventory data is received from a second wireless mobile communication device. The first inventory data and the second inventory data are compared to identify one or more matching data resources. In response to identifying one or more matching data resources, a matching inventory data that identifies the one or more matching data resources is sent to the first wireless mobile communication device. The matching inventory data enables the first wireless mobile communication device to access each of the one or more matching (Continued)

data resources stored on the second wireless mobile communication device.

10 Claims, 7 Drawing Sheets

(58) Field of Classification Search
USPC .............. 709/202, 203, 227, 228; 455/414.1, 455/412.2, 456.1
See application file for complete search history.

(56) References Cited

U.S. PATENT DOCUMENTS

| | | | |
|---|---|---|---|
| 7,342,928 B2* | 3/2008 | Boulay | H04L 29/06 370/395.2 |
| 7,664,242 B2 | 2/2010 | Finkelman | |
| 7,849,135 B2 | 12/2010 | Agrawal | |
| 2004/0264471 A1 | 12/2004 | Boulay | |
| 2005/0113076 A1 | 5/2005 | Lee | |
| 2006/0106867 A1* | 5/2006 | Burges | G06F 17/30026 |
| 2006/0166798 A1 | 7/2006 | Nelson | |
| 2007/0243821 A1 | 10/2007 | Hundscheidt et al. | |
| 2007/0287507 A1* | 12/2007 | Aton | H04M 19/04 455/567 |
| 2008/0084982 A1 | 4/2008 | Chatterjee | |
| 2009/0094317 A1 | 4/2009 | Venkitaraman | |
| 2009/0100050 A1* | 4/2009 | Erol | G06F 17/30026 |
| 2009/0111378 A1 | 4/2009 | Sheynman | |
| 2009/0276540 A1 | 11/2009 | Ahn | |
| 2010/0023585 A1 | 1/2010 | Nersu | |
| 2010/0046507 A1 | 2/2010 | Rosenberg | |
| 2010/0291909 A1 | 11/2010 | Nagaraja | |

FOREIGN PATENT DOCUMENTS

| | | |
|---|---|---|
| WO | 2007046101 A1 | 4/2007 |
| WO | 2011136708 A1 | 11/2011 |

OTHER PUBLICATIONS

Tucker, Adam, UK Intellectual Property Office, Examination Report, Application No. GB1321931.6, Apr. 22, 2016 pp. 1-5, (relevant pp. 1-5).
International Application No. PCT/IB2012/052190, International Search Report, Sep. 13, 2012.
GB Application No. GB1211919.4, Intellectual Property Office Search Report, Nov. 1, 2012.
Ball, Rudi, Content Sharing for Mobile Devices, Imperial College London Department of Computing, MSc in Advanced Computing Individual Project Report, Sep. 2007.
Kwong et al., Improving Cache Performance in Mobile Computing Networks Through Dynamic Object Relocation, 10th International Conference on Parallel and Distributed Systems, Jul. 7-9, 2004, Newport Beach, California.
Nordstrom et al, "A Search-Based Network Architecture for Mobile Devices," Technical report / Department of Information Technology, Uppsala University, 2009.
Chang et al., "Efficient End-to-End Authentication Protocols for Mobile Networks," Personal, Indoor and Mobile Radio Communications, 1996. PIMRC'96., Seventh IEEE International Symposium on (vol. 3), pp. 1252-1256 vol. 3.
Allow Hidden (BCCed) Email Recipients Who Know Each Other to See Each Other, The IP.com Prior Art Database, IP.com Disclosure No. IPCOM000211540D, Oct. 11, 2011.

* cited by examiner

USER PROFILE DATA
203

| User ID | Location | DC Data ID | Data Type |
|---|---|---|---|
| 1 | A | a, b, c | Category |
| | | e, f, g | Subscription |
| | | h, i, j | Data |
| 2 | B | a, b, k | Category |
| | | l, l, m | Subscription |
| | | n, o, p | Data |
| 3 | C | q, r, s | Category |
| | | t, f, u | Subscription |
| | | v, i, w | Data |

*Fig. 5*

MANAGING INVENTORY DATA FOR A DISTRIBUTED CACHE PROVIDED BY A PLURALITY OF WIRELESS MOBILE DEVICES

PRIORITY CLAIM

The present application is a continuation of U.S. patent application Ser. No. 14/122,322, titled "Managing Inventory Data for a Distributed Cache Provided by a Plurality of Wireless Mobile Devices," filed on Nov. 26, 2013, the contents of which is incorporated by reference herein.

BACKGROUND

1. Technical Field

The present disclosure relates to a method, apparatus or computer program product for managing inventory data of a distributed cache provided by a plurality of wireless mobile communication devices.

2. Description of the Related Art

Mobile devices such as mobile telephones are commonly used for data intensive activities such as information retrieval. Such intensive data activities have a negative effect on a mobile communications network since data transmission capacity of the mobile communications network may be limited or expensive.

There are several potential solutions to this problem. One such solution comprises caching data in a distributed cache provided by the mobile devices themselves such that each mobile device provides part of the storage required for the cache, and that the cache is shared among a group of mobile devices. Different caching policies are provided, each aimed at improving effectiveness of the distributed cache. However, problems arise with some mobile caching systems because of their intrinsically opportunistic nature. Each mobile device must discover relevant data by scanning the caches of all neighboring devices. Periodically scanning all neighboring devices to determine if relevant data exists in the neighboring devices uses a significant amount of power.

SUMMARY

Disclosed are a method, apparatus, and computer program product for distributing inventory data for a distributed cache provided by a plurality of wireless mobile communication devices. The method comprises: receiving first inventory data from a first wireless mobile communication device, the first inventory data identifying one or more data resources associated with the first wireless mobile communication device; receiving second inventory data from a second wireless mobile communication device, the second inventory data identifying one or more data resources associated with the second wireless mobile communication device; comparing the first inventory data and the second inventory data to identify one or more matching data resources; and in response to identifying one or more matching data resources, sending, to the first wireless mobile communication device, a matching inventory data that identifies the one or more matching data resources, wherein the matching inventory data enables the first wireless mobile communication device to access each of the one or more matching data resources stored on the second wireless mobile communication device.

The matching inventory data may further comprise an identification of the second device so as to enable the first wireless mobile communication device to initiate a connection directly with the second device. Receiving and sending of the inventory data may be performed using a first wireless communications network. The first and second devices create a peer-to-peer network to enable the access by the first wireless mobile communication device to the matching data resource stored on the second device. The method may comprise determining the location of the first and second devices. In another embodiment the sending of the matching inventory data may only be performed if the first and second devices are within a predetermined proximity. The location may be a predicted proximity determined for a predetermined future time period. The one or more data resources may comprise one or more of a data subscription, a data topic, a data category, a data item, a search term, a user preference, and a user interest.

The first wireless mobile communication device may further compile the first inventory data, send the first inventory data to a distributed cache (DC) server application program that is further configured to identify one or more other wireless mobile communication devices of the plurality of mobile devices having the one or more matching data resources, and receive the matching inventory data identifying the second device. In response to the first wireless mobile communication device receiving the matching inventory data, a user alert may be triggered. The first inventory data may identify any resources available from the first device to the second device or any resources required by the first device and/or may identify resources required by the first device that are available from the second device.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and are used to further illustrate, by way of example, embodiments of the present disclosure and to explain principles and advantages of the present disclosure.

FIG. 5 is an illustration of a table of user profile data used by the server application program of FIG. 4 according to an embodiment of the present disclosure;

DETAILED DESCRIPTION OF AN ILLUSTRATIVE EMBODIMENT

Described herein are a system, method, and computer program product for distributing inventory data in a distributed cache by a plurality of wireless mobile communication devices. Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the present disclosure. However, it will be understood by those skilled in the art that the present disclosure may be practiced without these specific details. In other instances, well-known methods, procedures, and components have not been described in detail so as not to obscure the present disclosure.

Figure 1:
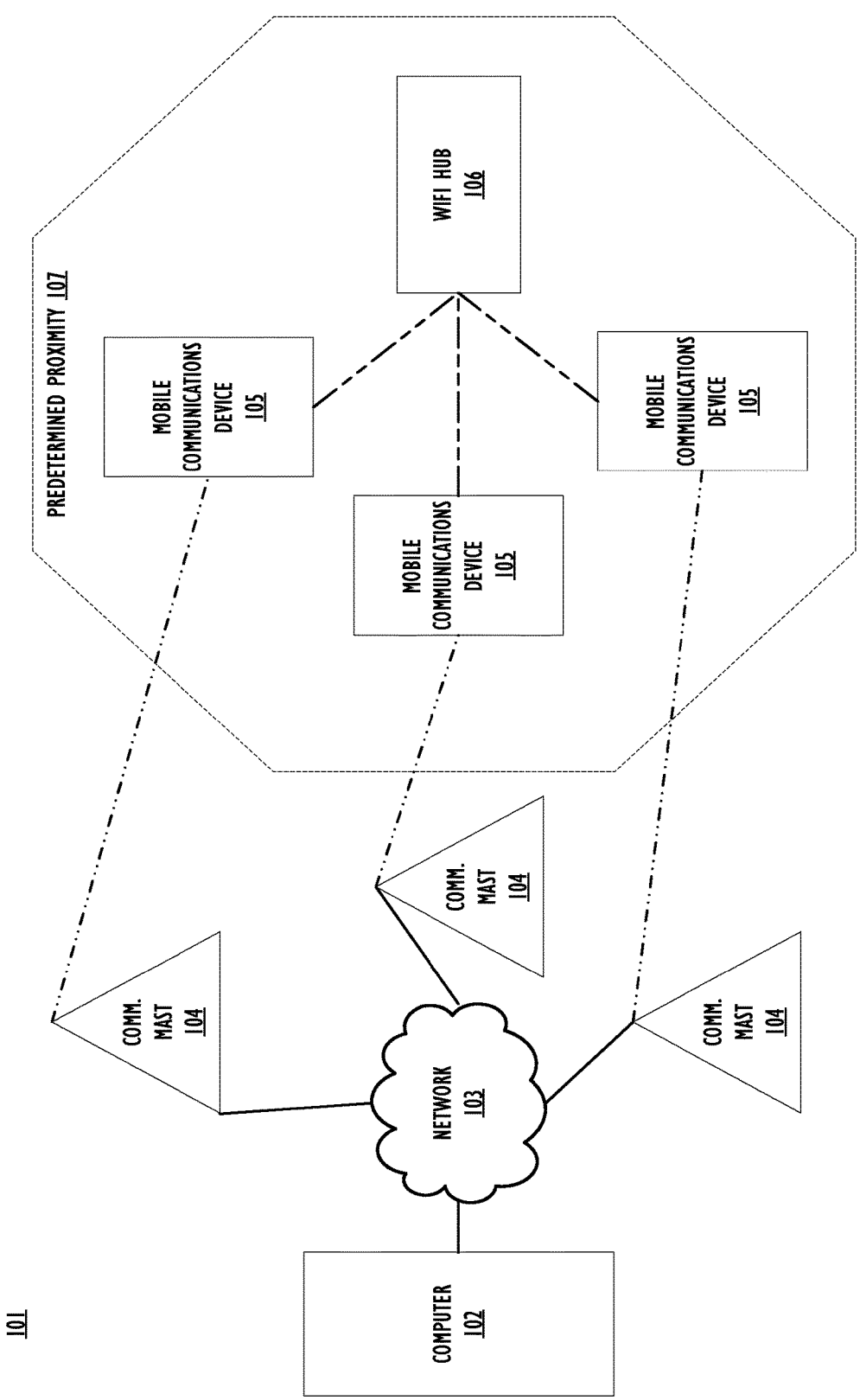
FIG. 1 is a block diagram of a communications network according to an embodiment of the present disclosure.

With reference to FIG. 1, a communications system comprises a computer 102 connected to a mobile communications core network 103, which in turn is connected to a mobile communications access network comprising a set of communications masts 104. Network 103 in combination with communications masts 104 provides mobile communications services to a plurality of mobile communications devices 105. In one embodiment mobile communications devices 105 are mobile and/or cellular telephones. In the present embodiment, each of the mobile communications devices 105 is further configured with a secondary wireless communications means, such as WiFi™, which enables connection to WiFi™ hub 106 or a secondary wireless communications hub. WiFi™ hub 106 enables network communications between mobile communications devices 105 as an alternative to network 103 and communications masts 104. As will be understood by those skilled in the art, mobile communications devices 105 need to be within a predetermined proximity 107 of WiFi™ hub 106 in order to use WiFi™ hub 106 to connect to other mobile communications devices 105.

Figures 2, 3:
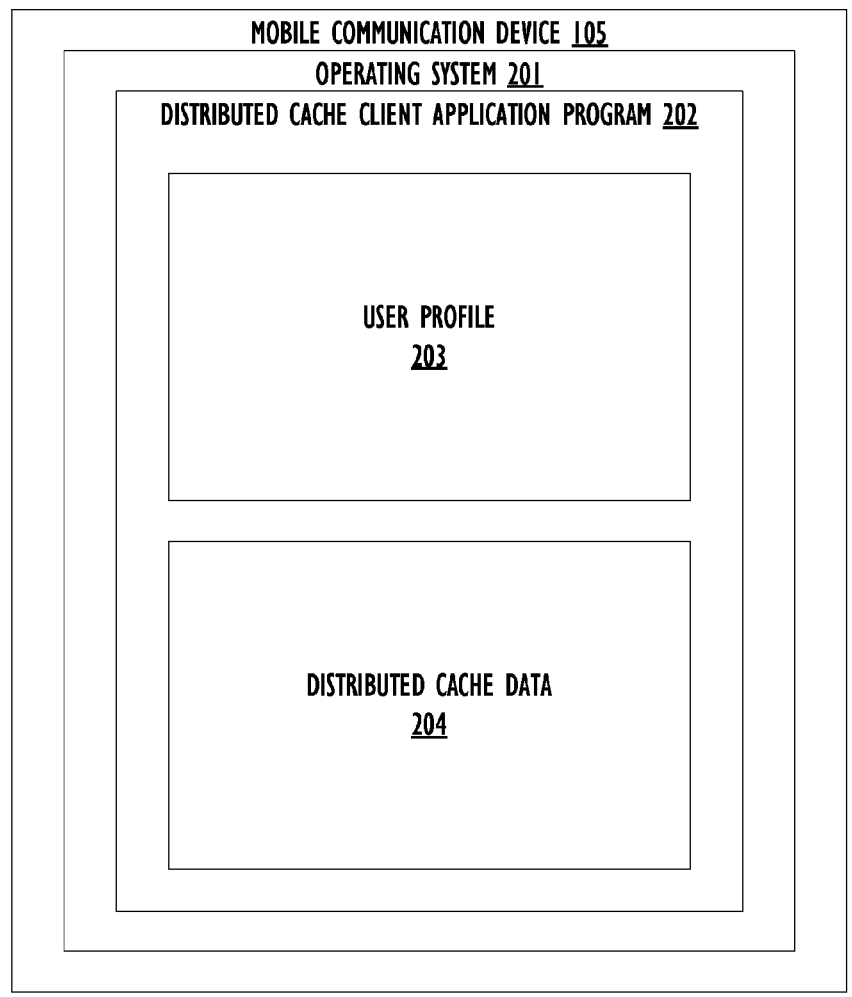
FIG. 2 is a schematic illustration of a client application program of one of the wireless mobile communication devices of FIG. 1 according to an embodiment of the present disclosure.
FIG. 3 is an illustration of a user profile comprising a user-defined inventory of data resources used by the client application program of FIG. 2 according to an embodiment of the present disclosure.

With reference to FIG. 2, there is depicted a mobile communications device 105 comprising an operating system 201 that provides a processing platform for a distributed cache (DC) client application program 202 (also referred to herein as DC client 202). In the present embodiment, DC client 202 uses two main sets of data: a user profile 203 and distributed cache (DC) data 204. DC client 202 is further configured to communicate with other DC clients 202 of the other mobile communications devices 105 to enable sharing of respective DC data 204 between DC clients 202 of the other mobile communications devices 105. The sharing of the data occurs in accordance with user preferences defined in user profile 203 of each mobile communication device 105.

With reference to FIG. 3, there is depicted user profile 203 which comprises a user-defined inventory of the data resources that DC client 202 (FIG. 2) is permitted to make available within the distributed cache. In the present embodiment, user profile 203 also comprises an inventory of those data resources that a user wishes to obtain from the distributed cache. That is, user profile 203 comprises an inventory of both DC data 204 available to other participating mobile communication devices 105 in addition to the data resources required or requested by the user from the distributed cache and supplied from one or more other mobile communications devices 105 (FIG. 2). DC data 204 is defined in the user profile 203 by a set of user selected DC data identifiers. In the present embodiment, the DC data identifiers are dependent on the type of the data resource. A data resource may comprise one or more data subscriptions, data topics, data categories, data items, search term, user preferences or user interests. Any suitable data resource may be defined (including by a user) to be included in DC data 204, or may be retrieved from one or more other mobile communications devices 105.

Figure 4:
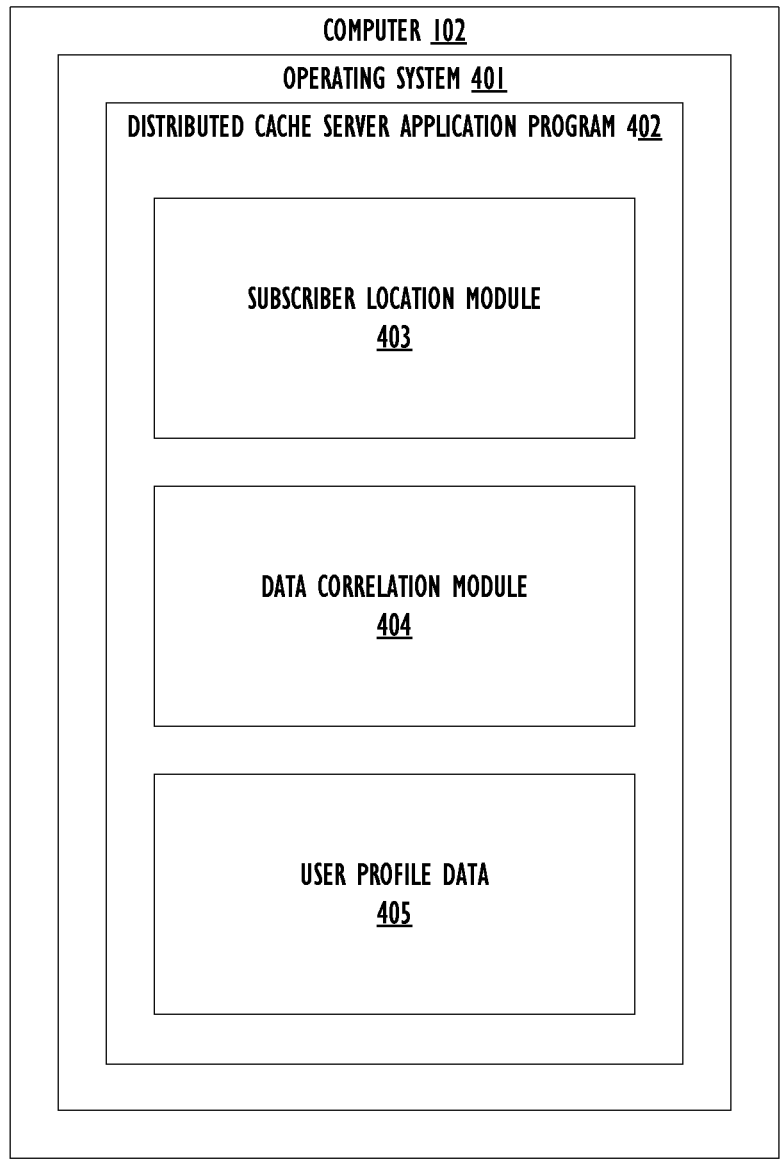
FIG. 4 is a block diagram of a server application program according to an embodiment of the present disclosure.

With reference to FIG. 4, there is illustrated a block diagram of computer 102 which comprises an operating system 401 configured to provide a processing platform for a distributed cache (DC) server application program 402 (also referred to herein as DC server 402). In the present embodiment, DC server 402 comprises at least two distinct modules: a subscriber location module 403 and a data correlation module 404. DC server 402 also stores a set of user profile data 405, which is in part collected from the DC client 202 of each of the mobile communications devices 105 (FIG. 2). Subscriber location module 403 is configured to determine the current location of each of the mobile communications devices 105. In one embodiment, subscriber location module 403 is configured to determine the current location of each other mobile communications device(s) 105 every 10 minutes. Data correlation module 404 is configured to analyze user profile data 405 to determine any matches between DC data 204 defined in user profiles 203 collected from each of the mobile communications devices 105 (FIG. 2).

With reference to FIG. 5, there is depicted a user profile data table comprising a user identifier (ID) for identifying other mobile communications devices 105, the location of each other mobile communications device 105 for the current time period as calculated by the subscriber location module 403, and the user profile 203 or inventory data received from each other mobile communications device 105. The data correlation module 404 is configured to determine, for a given mobile communication device 105, other mobile communications device(s) 105 within a predetermined proximity 107 that have matching DC data definitions. In response to detecting a match, DC server 402 notifies each mobile communication device 105 within the predetermined proximity 107 having matching DC data definitions. This notification provides an indication, and/or informs a user of a mobile communication device 105 receiving the notification, of available data resources in the distributed cache. The receiving mobile communication device may then, via the DC client 202, negotiate the retrieval of any such data of interest from other mobile communication device(s) 105 within predetermined proximity 107 having relevant available data resources. The retrieval of the data is negotiated by the DC clients 202 of each respective mobile communications device 105. The retrieval is performed over a peer-to-peer network established via a secondary wireless communication means or a secondary wireless communications hub (e.g. via WiFi™ hub 106). Any other available secondary wireless communications means may be utilized. As will be understood by those skilled in the art, other available secondary wireless peer-to-peer mechanisms and communications means for communicating between DC clients on the mobile communication devices for sharing DC data may include, for example, Bluetooth™ WiMax™, or any other local wireless underlay network.

Figure 6:
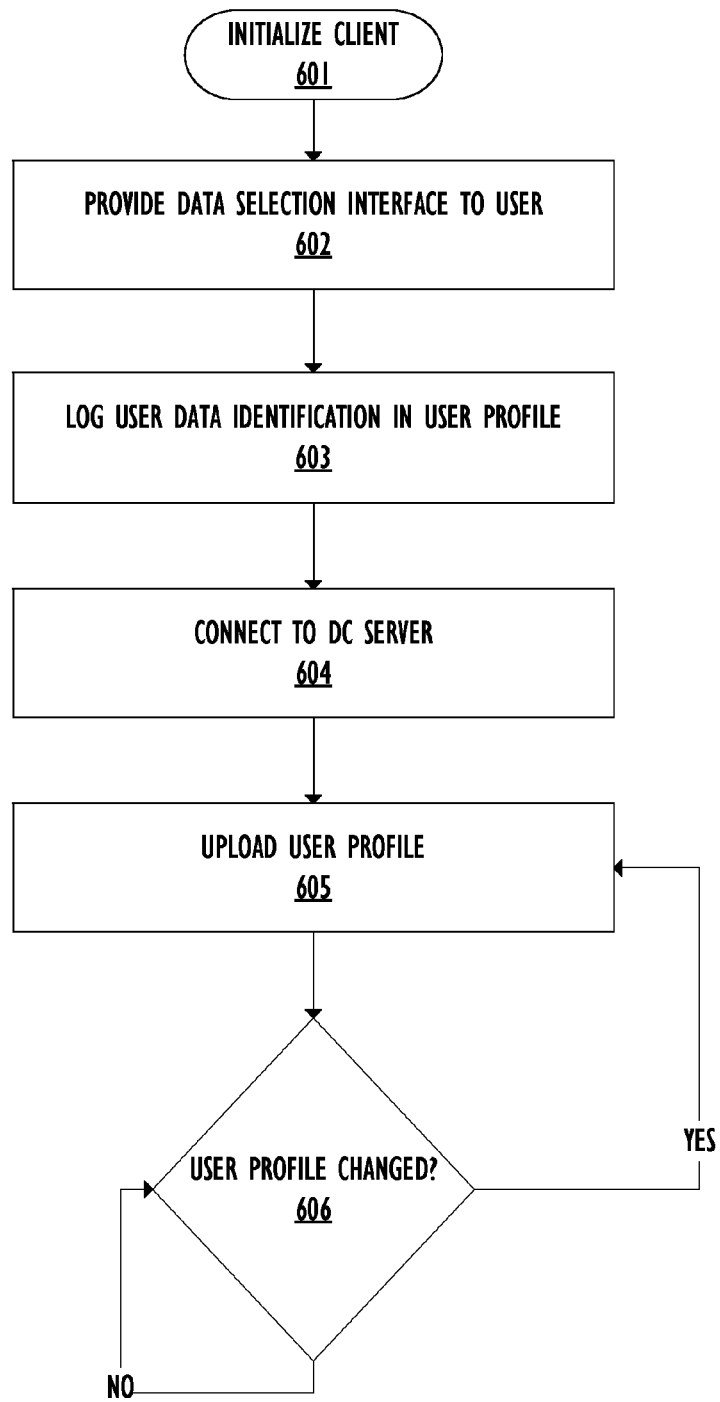
FIG. 6 is a flow diagram of a method performed by a client application program according to an embodiment of the present disclosure.

With reference to FIG. 6, there is depicted a flow chart of the processing method performed by DC client application program 202 on initialization, in accordance with one embodiment of the disclosure. At step 601 processing of the DC client 202 is initiated in response to the start-up of the DC client 202. At step 602 a data selection interface is presented to enable selection and identification of data resources for user profile 203. At step 603 the identified data resources are logged in the user profile 203. At step 604 a connection to the DC server 402 is established. At step 605 user profile 203 is uploaded to DC server 402. At step 606 processing pauses until user profile 203 is again updated. In response to the user profile 203 being updated, the processing returns to step 605 to upload the updated user profile 203.

Figure 7:
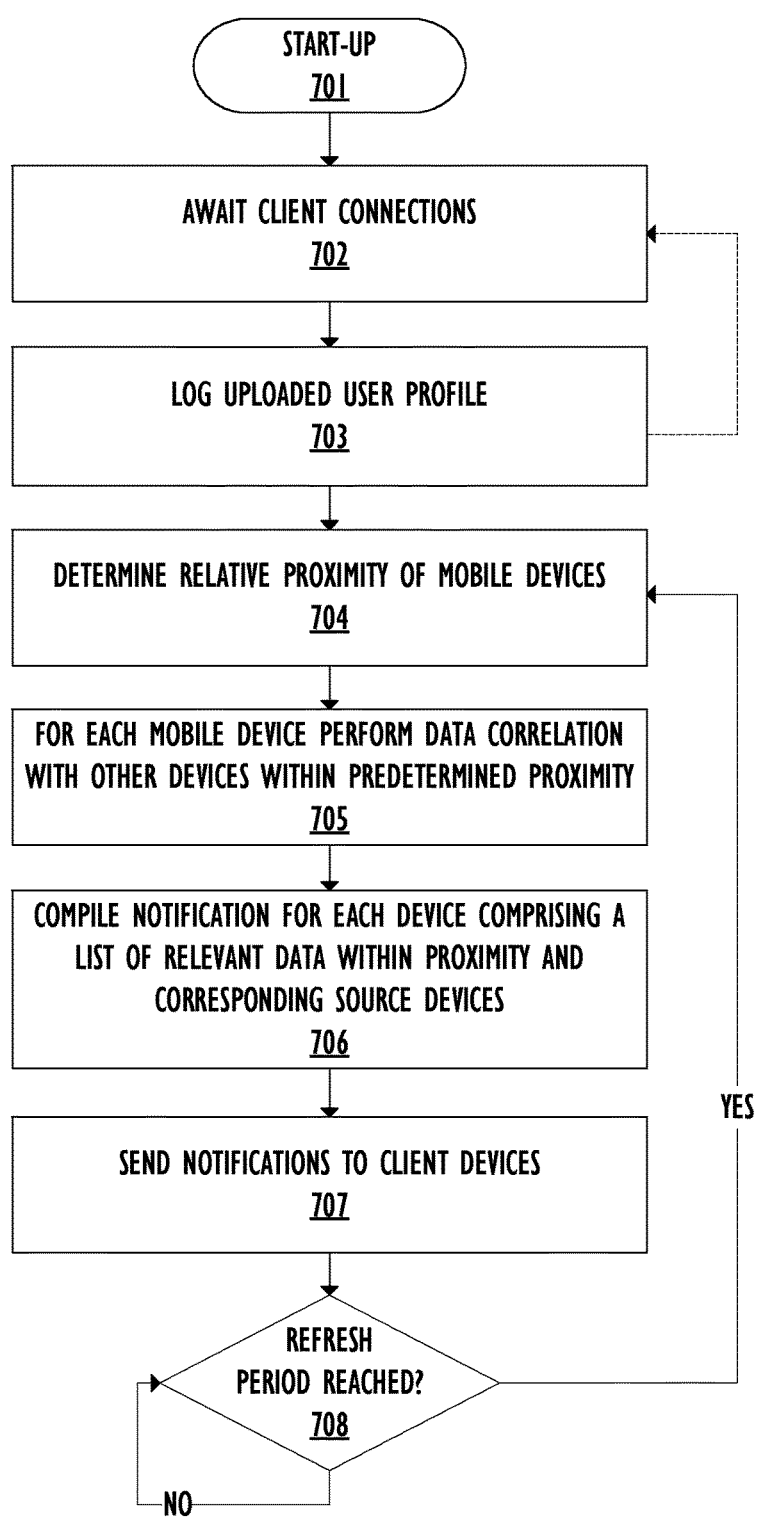
FIG. 7 is a flow diagram of a method performed by the server application program according to an embodiment of the present disclosure.

With reference to the flow chart of FIG. 7, there is depicted a flow chart of a processing method performed by DC server application program 402. At step 701 processing of DC server 402 is initiated in response to the start-up of DC server 402 on a mobile communication device 105. At step 702 processing awaits the upload of a first user profile 203. In response to receiving the first user profile, the uploaded user profile 203 is logged in user profile data 405 (step 703). In one embodiment steps 702-703 may repeat until two or more user profiles have been uploaded into the user profile data 405 and may also further continue for additional user profiles even while processing further continues as provided below. At step 704 subscriber location module 403 is utilized to determine the locations of each mobile communication device 105 logged into user profile data 405. At step 705 data correlation module 404 is utilized to determine matches between user profile data 405 and mobile communications devices 105 within a predetermined proximity 107. At step 706 a notification is compiled for each mobile communication device 105. The notification comprises a list of the relevant data resources available from corresponding identified mobile communication devices 105 within the predetermined proximity 107. At step 707 the compiled notifications are sent to each of the identified mobile communication devices 105. Processing then waits for completion of a refresh period (step 708). Once the refresh period has been reached/completed, the processing returns to step 704 and proceeds as described above to further refresh the proximity and correlation data before issuing updated notifications to mobile communications devices 105 within a predetermined proximity 107.

Figure 8:
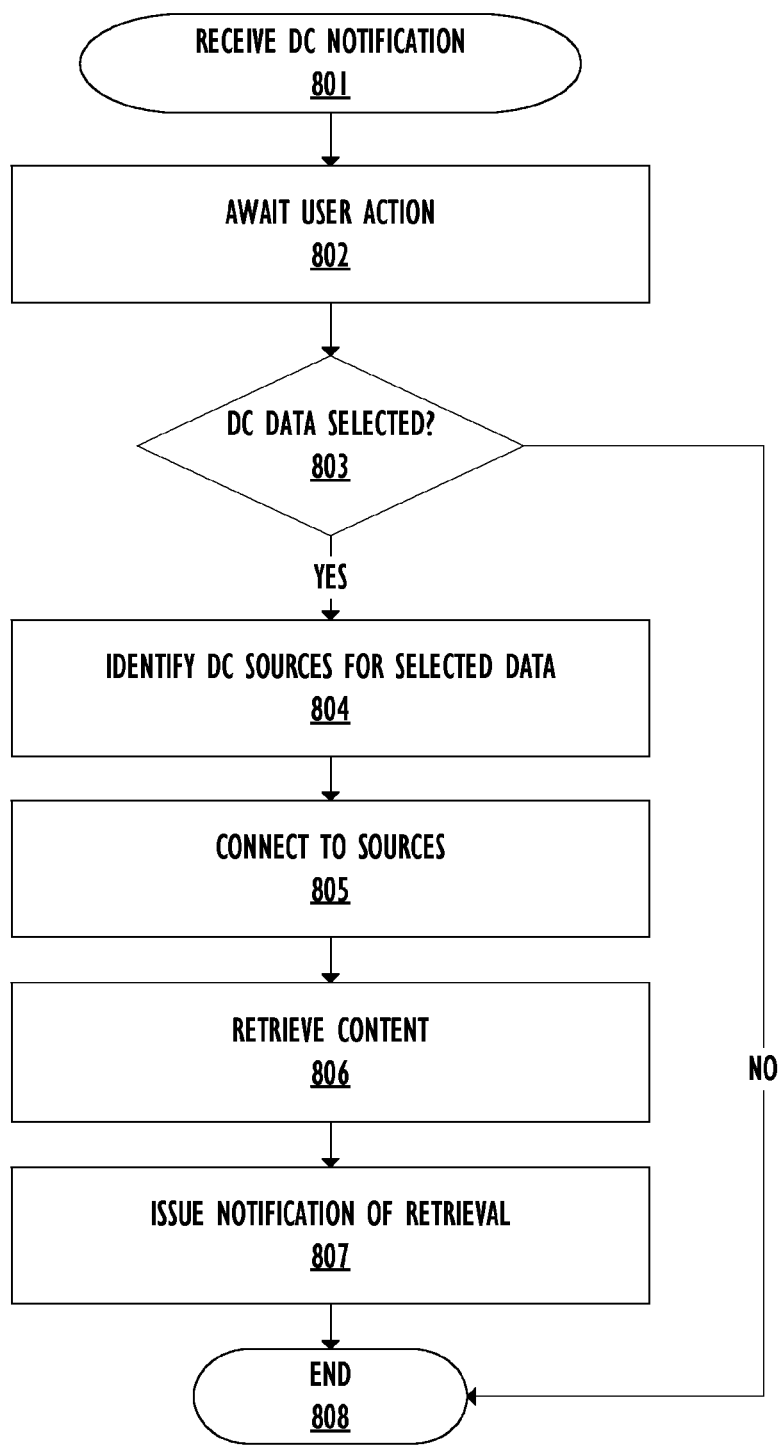
FIG. 8 is a flow diagram of a method performed by the client application program in response to receiving a notification from a distributed cache (DC) server application program, according to an embodiment of the present disclosure.

With reference to the flow chart of FIG. 8, there is depicted the processing performed by a DC client application program 202 in response to receiving a notification from DC server 402. At step 801 processing is initiated in response to the receipt of a notification from DC server 402. At step 802 an alert is issued to signal the receipt of the notification and processing waits for user interaction (step 803). If, at step 803, DC data is not selected, the process terminates (end step 808). In response to receiving a selected DC data in response to the notification (step 803), the processing moves to step 804 where the sources for the selected DC data are identified from the notification. At step 805 a connection is negotiated with each available source mobile communications device 105 having the DC data. At step 806 the selected data is retrieved from at least one connected source of the available source mobile communications devices 105. A notification is then issued, which provides an indication of the retrieval of the selected DC data (step 807). The processing then terminates at step 808.

In another embodiment, the user profile is further configured to enable defining of two sets of inventory data. The first set of inventory data defines the data resources available for sharing via the distributed cache. The second set of inventory data defines data resources that the user wishes to source from the distributed cache. Thus, the second set of data defines the requested data resources and/or the data to be sourced from the distributed cache. In the present embodiment, the notifications received from the DC server comprise an identification of the resources for the requested data such as an identification of the other mobile communication devices within the distributed cache that may provide the requested data resource. The DC client may be further configured to provide only the first set of inventory data where only data sharing is required. Alternatively, the DC client may be configured to provide only the second set of inventory data to the DC server where only data acquisition or sourcing is required.

In another embodiment, the DC server application is provided with data identifying the locations of suitable nodes for secondary wireless communication between the mobile communication devices, such as available WiFi™ nodes. The location of such available nodes is taken into account when determining proximity of devices for a given notification. For example, the measure of relative proximity may be centered on a WiFi™ node so as to ensure that all relevant mobile communication devices contributing to the distributed cache are within operational range.

As will be understood by those skilled in the art, the DC server may be further configured to use any suitable location technique for determining the positions of the relevant mobile communication devices. For example, to locate mobile communication devices the DC server may utilize network based systems, such as mobile signal triangulation, or device based systems, such as Global Positioning Satellites (GPS). In another embodiment the mobile communication devices are configured to determine their own respective positions which may then be transmitted to the DC server.

In another embodiment, the DC client application program is configured to perform part or all of the determination of which other mobile communication devices are within suitable proximity. For example, the DC server may supply only the positions of other mobile communication devices in a notification. The DC clients then individually determine which other mobile communication devices are within a suitable proximity based on their own self-calculated position. In another embodiment the location of mobile communication devices performed by either the DC server or DC client are predictive such that positions of mobile communication devices are calculated for a future time slot.

As will be understood by those skilled in the art, any suitable correlation technique may be employed for determining correlations between user profiles. In another embodiment, the data correlation method is predictive. User subscriptions or other data sources may be monitored to determine data likely to be available on a given mobile communication device.

Embodiments of the disclosure provide a system in which mobile communication devices within the distributed cache gain prior knowledge from the network on the availability and proximity of relevant data in neighboring devices. With this knowledge, mobile communication devices within the distributed cache passively engage in sharing subscribed content that is relevant to a user, thus conserving power. Embodiments of the disclosure provide a deterministic content retrieval system in which participating mobile communication devices share targeted content classes.

Embodiments of the disclosure enable autonomous information sharing between anonymous neighboring mobile communication devices, minimally assisted by the network through the use of optionally predictive location and optionally predictive content of the targeted mobile communication devices. The participating mobile communication devices are able to acquire knowledge of content that the network has determined to exist within a local area. By utilizing prediction techniques for mobile location and content, the need for wide-spread scanning is removed thus reducing the overhead on the network. Embodiments of the disclosure differ from opportunistic distributed content sharing systems by enabling devices to independently acquire knowledge of nearby relevant data and target the acquisition of this data, thus conserving energy and enabling targeted content retrieval.

It will be understood by those skilled in the art that the apparatus that embodies a part or all of the present disclosure may be a general purpose device having at least one processor, a memory, and a software executing on the at least one processor that is further configured to provide a part or all of an embodiment of the disclosure. The device may be a single device or a group of devices. The software may be a single program or a set of programs. Furthermore, any or all of the software used to implement the disclosure can be communicated via any suitable transmission or storage means so that the software can be loaded onto one or more devices.

The present disclosure can take the form of a computer program product accessible from a computer-usable or computer-readable storage device providing program code for use by or in connection with a computer or any instruction execution system. For the purposes of this disclosure, a computer usable or computer-readable storage device can be any tangible apparatus that contains, stores, communicates, propagates, or transports the program for use by or in connection with the instruction execution system, apparatus, or device. The device can be an electronic, magnetic, optical, electromagnetic, or semiconductor system (or apparatus or device). Examples of a computer-readable storage device include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

While the present disclosure has been described with reference to exemplary embodiments, and while the embodiments have been described in considerable detail, it will be understood by those skilled in the art that various changes may be made and equivalents may be substituted for elements thereof without departing from the scope of the disclosure. Additional advantages and modifications will readily appear to those skilled in the art. The description of the present disclosure has been presented for purposes of illustration and description, but is not intended to be exhaustive or limited to the disclosure in the form disclosed. Many improvements, modifications, and variations will be apparent to those of ordinary skill in the art without departing from the scope and spirit of the present disclosure. In addition, many modifications may be made to adapt a particular system, device or component thereof to the teachings of the disclosure without departing from the essential scope thereof The embodiment was chosen and described in order to best explain the principles of the disclosure and the practical application, and to enable others of ordinary skill in the art to understand the disclosure for various embodiments with various modifications as are suited to the particular use contemplated. Therefore, it is intended that the disclosure not be limited to the particular embodiments disclosed for carrying out this disclosure, but that the disclosure will include all embodiments falling within the scope of the appended claims.

What is claimed is:

1. A method for distributing inventory data for a distributed cache provided by a plurality of wireless mobile communication devices, said method comprising:
   receiving, at a distributed cache server, first inventory data from a first wireless mobile communication device that is communicatively coupled to the distributed cache server, said first inventory data identifying one or more data resources associated with said first wireless mobile communication device;
   receiving, at the distributed cache server, second inventory data from a second wireless mobile communication device that is communicatively coupled to the distributed cache server, said second inventory data identifying one or more data resources associated with said second wireless mobile communication device;
   the distributed cache server comparing said first inventory data and said second inventory data to identify one or more matching data resources; and
   in response to identifying one or more matching data resources, the distributed cache server sending, to said first wireless mobile communication device, a matching inventory data that identifies said one or more matching data resources, wherein said matching inventory data enables said first wireless mobile communication device to access each of said one or more matching data resources stored on said second wireless mobile communication device.

2. The method according to claim 1, wherein said matching inventory data further comprises an identification of said second wireless mobile communication device, and wherein said matching inventory data enables said first wireless mobile communication device to initiate a connection directly with said second wireless mobile communication device.

3. The method according to claim 1, wherein said sending of said matching inventory data to said first wireless mobile communication device is performed using a first wireless communication network, and wherein said first wireless mobile communication device and second wireless mobile communication device create a peer-to-peer network that enables said access by said first wireless mobile communication device to said one or more matching data resources stored on said second wireless mobile communication device.

4. The method according to claim 1, further comprising:
the distributed cache server determining a location of said first wireless mobile communication device and said second wireless mobile communication device;
wherein said matching inventory data is sent to said first wireless mobile communication device only if said first wireless mobile communication device and said second wireless mobile communication device are within a predetermined proximity.

5. The method according to claim 4, wherein said location is a predicted proximity determined for a predetermined future time period.

6. The method according to claim 1, wherein an inventory data of data resources comprises one or more of: a data subscription, a data topic, a data category, a data item, a search term, a user preference, or a user interest.

7. The method according to claim 1, wherein said first wireless mobile communication device:
compiles said first inventory data on said first wireless mobile communication device;
sends said first inventory data to a server application program that is configured to identify one or more other wireless mobile communication devices of said plurality of wireless mobile communication devices having said one or more matching data resources; and
receives, from said server application program, said matching inventory data.

8. The method according to claim 7, further comprising:
in response to said first wireless mobile communication device receiving said matching inventory data, triggering a user alert.

9. The method according to claim 7, wherein said first inventory data is further configured to identify at least one of one or more resources available of said first wireless mobile communication device to said second wireless mobile communication device and one or more resources required by said first wireless mobile communication device.

10. The method according to claim 9, wherein said matching inventory data identifies said one or more resources required by said first wireless mobile communication device that are available from said second wireless mobile communication device.

* * * * *